United States Patent
Le et al.

(10) Patent No.: US 11,396,338 B2
(45) Date of Patent: Jul. 26, 2022

(54) CONVERTIBLE PASSENGER AND CARGO AREA FOR VEHICLE

(71) Applicant: HONDA MOTOR CO., LTD., Tokyo (JP)

(72) Inventors: Tuyen Le, Torrance, CA (US); Robert Curiel, Torrance, CA (US); Jackie Porchay, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 518 days.

(21) Appl. No.: 16/542,702

(22) Filed: Aug. 16, 2019

(65) Prior Publication Data

US 2021/0046990 A1    Feb. 18, 2021

(51) Int. Cl.

| | | |
|---|---|---|
| *B62K 5/05* | (2013.01) | |
| *B62J 7/02* | (2006.01) | |
| *B62K 5/08* | (2006.01) | |
| *B62J 1/12* | (2006.01) | |
| *B62J 17/08* | (2020.01) | |
| B62J 17/083 | (2020.01) | |

(52) U.S. Cl.
CPC ... *B62J 1/12* (2013.01); *B62J 7/02* (2013.01); *B62J 17/08* (2013.01); *B62K 5/05* (2013.01); *B62K 5/08* (2013.01); *B62J 17/083* (2020.02)

(58) Field of Classification Search
CPC ... B62J 9/00; B62J 17/083; B62J 17/08; B62J 7/02; B62K 5/06; B62K 5/08; B62K 5/05
See application file for complete search history.

(56) References Cited

U.S. PATENT DOCUMENTS

| 1,092,910 | A | * | 4/1914 | Harley | B62J 1/14 |
| | | | | | 280/202 |
| 1,540,271 | A | * | 6/1925 | Mayer | B62K 9/02 |
| | | | | | 280/274 |
| D113,888 | S | * | 3/1939 | Wilcox | D12/112 |
| 4,277,078 | A | * | 7/1981 | Root | B62K 5/05 |
| | | | | | 280/281.1 |
| 4,740,004 | A | * | 4/1988 | McMullen | B62K 5/08 |
| | | | | | 280/282 |
| 4,863,183 | A | * | 9/1989 | Hwang | B62K 5/10 |
| | | | | | 280/282 |

(Continued)

OTHER PUBLICATIONS

Golf Trucks, "Golf Truck Models", Golf Trucks, 7 Pages Total, (2019).

*Primary Examiner* — Tony H Winner
*Assistant Examiner* — Michael R Stabley
(74) *Attorney, Agent, or Firm* — ArentFox Schiff LLP (57) ABSTRACT

A vehicle including a drive wheel and a set of pedals coupled to the drive wheel. The vehicle includes a steering shaft connected to two front wheels. The vehicle includes a front load unit that may be engaged to be supported on a subframe between the two front wheels, the load unit being convertible between passenger seat and cargo storage configurations. In an aspect, the front load unit includes a horizontal load area and a substantially vertical shell forming a back wall and side walls. The front load unit may include a foot support hingedly mounted to the horizontal load area and pivotable between a lower position when the front load unit is configured as a passenger seat and a raised position parallel to the horizontal load area when the front load unit is configured as a cargo storage area.

18 Claims, 5 Drawing Sheets

(56) References Cited

U.S. PATENT DOCUMENTS

| | | | | |
|---|---|---|---|---|
| 4,917,396 | A * | 4/1990 | Meneses | B62K 5/08 224/450 |
| 6,161,860 | A * | 12/2000 | Comeau | B62K 5/023 482/68 |
| 7,946,373 | B2 * | 5/2011 | Gibson | B62K 5/02 180/206.5 |
| 7,980,628 | B2 | 7/2011 | Hu et al. | |
| 8,002,331 | B2 | 8/2011 | Bowers et al. | |
| 8,191,907 | B2 * | 6/2012 | Watson | B62B 3/02 280/30 |
| 8,267,454 | B2 | 9/2012 | Takano et al. | |
| 8,322,770 | B2 | 12/2012 | Kosuge et al. | |
| 8,328,262 | B2 | 12/2012 | Kawabata et al. | |
| 8,387,734 | B2 | 3/2013 | Krosschell et al. | |
| 8,939,490 | B2 * | 1/2015 | Surridge | B60P 3/423 296/183.1 |
| 9,114,844 | B2 * | 8/2015 | Walter | B62K 7/04 |
| 9,150,271 | B1 * | 10/2015 | Liu | B62K 5/06 |
| 9,333,977 | B2 * | 5/2016 | Herlitz | B62B 3/007 |
| 9,840,301 | B2 * | 12/2017 | Barak | B60N 2/2209 |
| 10,077,062 | B2 * | 9/2018 | Bowman | B62B 3/022 |
| 10,577,045 | B2 * | 3/2020 | Walter | B62K 3/02 |
| 10,787,217 | B2 * | 9/2020 | Mogensen | B62K 7/04 |
| 11,142,274 | B1 * | 10/2021 | Thompson | B62K 3/02 |
| 2005/0264048 | A1 | 12/2005 | Collins | |
| 2007/0057526 | A1 | 3/2007 | Bigelow et al. | |
| 2016/0272264 | A1 * | 9/2016 | Mogensen | B62K 5/10 |
| 2018/0050755 | A1 * | 2/2018 | Walter | B62K 7/02 |
| 2018/0265154 | A1 * | 9/2018 | Mulyadi | B62M 6/70 |
| 2019/0016406 | A1 * | 1/2019 | Taylor | B62K 13/00 |
| 2020/0094903 | A1 * | 3/2020 | Weber | B62K 5/027 |
| 2020/0216135 | A1 * | 7/2020 | Taylor | B62K 19/34 |
| 2021/0016853 | A1 * | 1/2021 | Yu | B62K 7/04 |

* cited by examiner

CONVERTIBLE PASSENGER AND CARGO AREA FOR VEHICLE

FIELD OF THE INVENTION

Aspects of the present disclosure relate to a convertible passenger and cargo area. More specifically, aspects relate to a convertible passenger and cargo area for an electrically or otherwise powered vehicle.

BACKGROUND

As vehicle congestion and associated pollution increases, especially in urban areas, the need exists for alternative transportation. Bicycles are a well-known alternative for convenient and efficient transportation. However, the need exists to transport cargo or people who may be otherwise unable to utilize a bicycle as a method of cargo carrying or transportation. Light transport vehicles, such as bicycle trailers, are often utilized to transport cargo or children. However, light transport vehicles rely on a bicycle to tow the trailer. Bicycle trailers have several disadvantages, including the need for an attachment mechanism for connection to a bicycle. Further, a bicycle connected to a trailer may be cumbersome and difficult to handle or maneuver in certain situations. Thus, bicycle trailers may be unstable and/or cumbersome for frequent transport of cargo or children. In addition, bicycle trailers are not practical for transport of adults or for hauling heavier cargo.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

There remains an unmet need in the related art for a practical vehicle that is capable of stable and practical transportation of cargo and/or people. In an aspect, the disclosure provides a vehicle including a rear drive wheel and optionally a set of pedals coupled to the rear drive wheel. The vehicle includes a steering shaft connected to two front wheels. The vehicle includes a front load unit supported on a frame between the two front wheels that is convertible between use for a passenger seat and a cargo storage area. In an aspect, the front load unit includes a horizontal load area and a substantially vertical shell forming a back wall and side walls. In one example implementation, the front load unit may include a foot support hingedly mounted to the horizontal load area that is pivotable or otherwise movable between a lower position when the front load unit is configured as a passenger seat and a raised position parallel to the horizontal load area when the front load unit is configured as a cargo storage area.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The novel features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

The disclosure relates to various aspects of one or more vehicles, as well as a convertible front load unit for the vehicle enabling carrying of passengers and/or cargo. In one example, a vehicle usable with aspects of the current disclosure includes a frame, a rear wheel, and two front wheels that are steerable via a steering apparatus. The vehicle may be powered via operation of a user sitting on a vehicle seat. The user may steer the front two wheels via a handlebar or other steering device that is in operable communication with the steering apparatus. The user may be located behind the front load unit, which may be supported on a subframe between the front two wheels. Further aspects of example vehicles and front load units in accordance with aspects of the present disclosure will be described with relation to the figures below.

Figure 1:
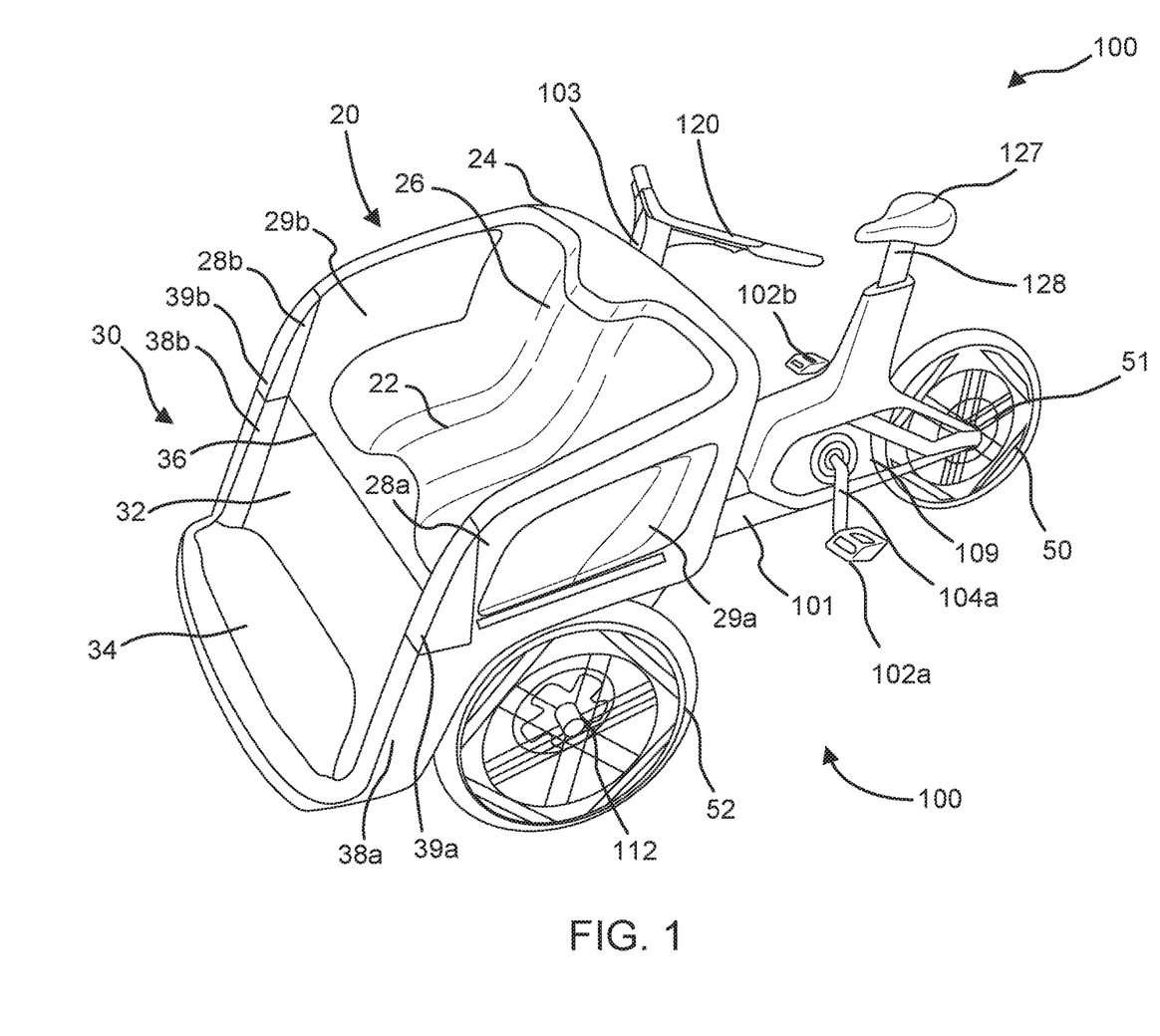
FIG. 1 is a perspective view of an example vehicle with a convertible passenger and cargo carrying portion in accordance with one aspect of the disclosure.
Figure 2:
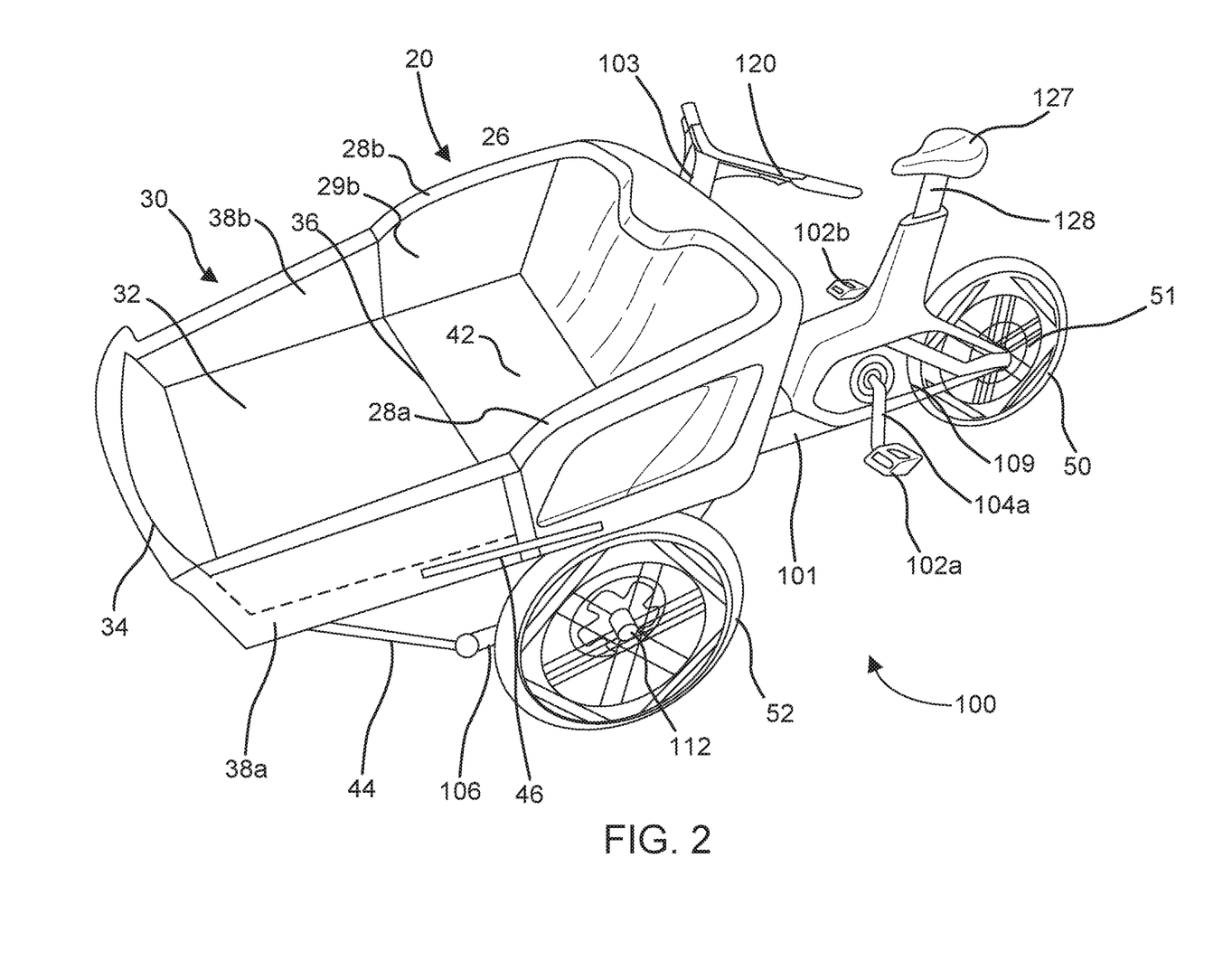
FIG. 2 is a perspective view of the vehicle of FIG. 1 with the convertible passenger and cargo carrying portion configured for cargo in accordance with one aspect of the disclosure.
Figure 3:
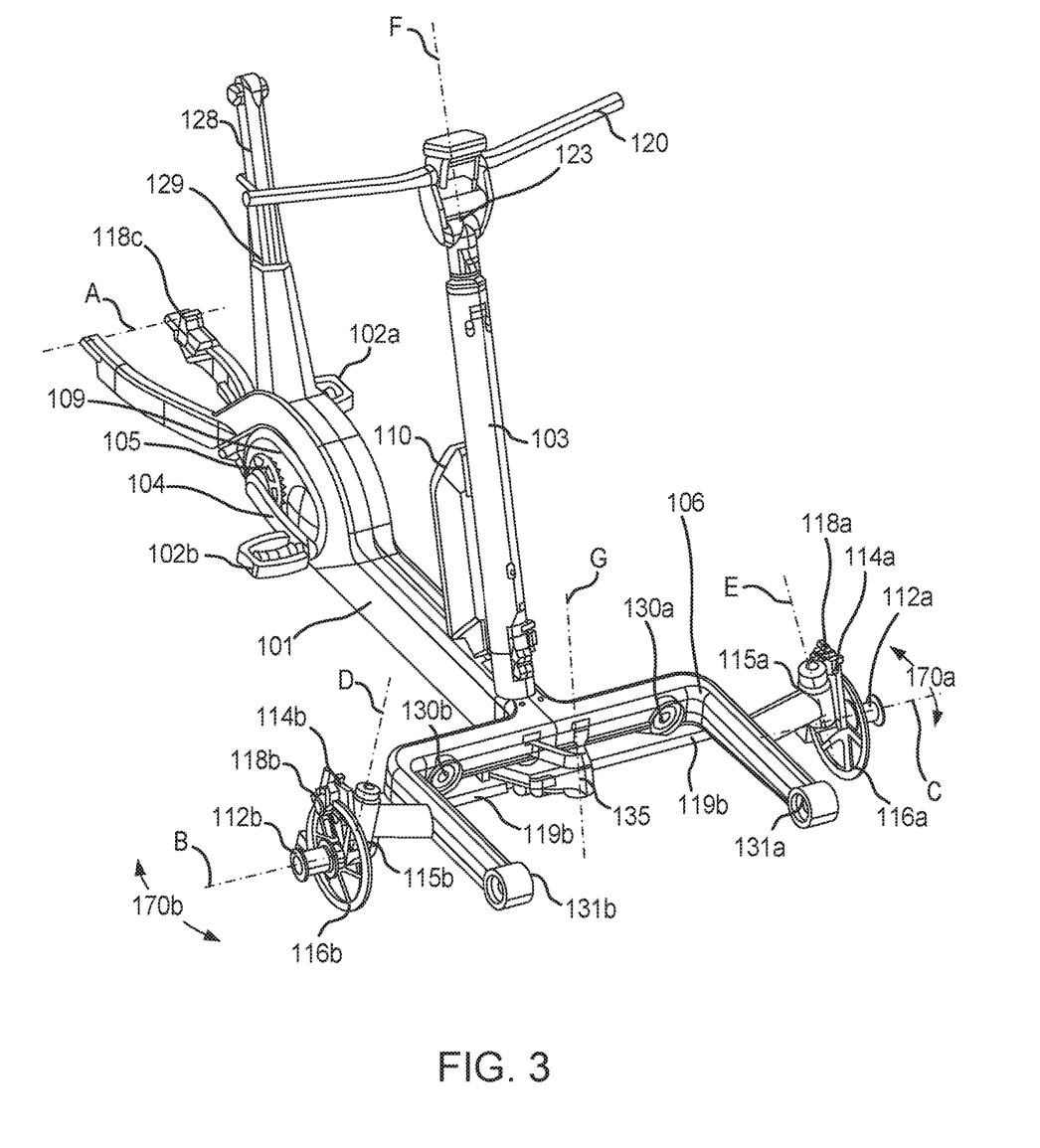
FIG. 3 is front perspective view of an example vehicle frame and steering mechanism in accordance with one aspect of the disclosure.

FIGS. 1-3 show one example of a vehicle in accordance with and usable with aspects of the present disclosure. While FIGS. 1-3 show a vehicle having pedal features (e.g., pedal powered, starting, or assist), a "vehicle," as used herein is not limited to such a vehicle having pedals, and refers to any moving vehicle that is powered by any form of energy. A vehicle may carry human occupants or cargo or both.

FIG. 1 shows a perspective view of an example vehicle 100 having and/or usable with various features in accordance with aspects of the current disclosure. It is noted that at least one example and/or further details for a number of the components referenced in the vehicle 100 in FIG. 1 are described in further detail with reference to FIGS. 2-4. As shown in FIG. 1, an example vehicle 100, may be configured to have a convertible front load unit 20 (e.g., configured for carrying passengers as illustrated in FIG. 1) that converts into, or alternatively may be interchanged with, a cargo-carrying portion (e.g., as illustrated in FIG. 2). The convertible front load unit 20 may be mounted on or in the area of U-shaped subframe 106 (FIG. 3) of the vehicle 100. As shown in FIGS. 1 and 2, the convertible front load unit 20 may, for example, include a seat 22 (FIG. 1) for carrying a single or multiple passengers and/or provide a cargo area 42 (FIG. 2) for storage and/or transportation of cargo via the vehicle 100.

In the passenger configuration illustrated in FIG. 1, the front load unit 20 may include a seat 22. As illustrated, the seat 22 may be configured for supporting two adult passengers. For example, the seat 22 may include contours for two passengers. However, variations may support a single adult passenger, or an adult and one or more children. In an aspect, the seat 22 may include one or more removable cushions, which may be, for example, removably attached using magnets and/or other features. The cushions may be removed when the front load unit 20 is converted to a cargo configuration to expose a cargo area 42 (FIG. 2), for example.

The front bad unit 20 may also include a shell 24. In an aspect, the seat 22 and shed 24 may be formed as a single piece using molding or additive manufacturing techniques. The shell 24 may enclose the back and sides of the seat 22. For example, the shell 24 may form a back wall 26 and side walls 28a and 28b extending upward from the seat 22. Generally, the back wall 26 may be tall enough to support the back of a passenger. Accordingly, in an aspect, the back wall 26 may be, for example, approximately 30-90 cm high. The side walls 28a and 28b may support a passenger leaning sideways, and/or otherwise help retain or secure passengers from the side. The side walls 28a and 28b may also serve as armrests. In an aspect, for example, the side walls 28a and 28b may be approximately 20-60 cm high. In an aspect, the side walls 28a and 28b may include a respective window 29a and 29b.

The front load unit 20 may also include a foot support 30. In the passenger configuration, the foot support 30 may provide a place for one or more passengers to rest their feet. The foot support 30 may prevent the feet from contacting the ground, front wheels 52, and/or other moving parts of the vehicle 100. The foot support 30 may include a leg back portion 32 and a foot portion 34. The leg back portion 32 may extend downward from the seat 22. The foot portion 34 may extend forward from an end of the leg back portion 32. The foot support 30 may be hingedly mounted to the seat 22 at a forward edge of the seat 22. For example, a hinge 36 may extend between the side walls 28a and 28b, or multiple hinges may couple the foot support 30 to the seat 22.

In an aspect, the foot support 30 may also include side walls 38a and 38b. In an aspect, the side walls 38a and 38b may extend respectively from side walls 28a and 28b. The side walls 38a and 38b may enclose the legs of the passengers to restrict sideways movement of the legs outside of the passenger seating area. In an aspect, a continuous wall section that includes side wall 28a and side wall 38a, for example, may interoperate with another portion, 39a, 39b so as to prevent movement of the foot support 30 into a raised position. In an aspect, removable portions 39a, 39b may be detachably coupled to each of the respective side wall 28a, 28b and side wall 38a, 38b. The removable portions 39a, 39b may be removed prior to converting between the lowered position and raised position of the foot support 30, so as to allow the side walls 38a, 38b to pivot relative to side walls 28a, 28b, respectively, via hinge 36 while the removable portions 39a, 39b are removed. In another aspect, such removal of the removable portion 39a, 39b may thereby allow movement of the foot support 30. In an aspect, the side wall 28a, 28b and side wall 38a, 38b may include corresponding coupling mechanisms (e.g., latches, bolts, straps) for coupling the side wall 28a, 28b and side wall 38a, 38b directly to one another in the raised position when the removable portions 39a, 39b are removed and/or enabling coupling of the side walls 28a, 28b, 38a, 38b to the removable portions 39a, 39b when the foot portion 34 is in the lower position and the removable portions 39a, 39b are in place.

As shown in FIG. 2, in the example implementation of FIG. 1, the foot support 30 may be pivoted to a raised position to convert the front load unit 20 to a cargo configuration. In this configuration, the leg back portion 32 may be parallel to the seat 22 to form a continuous cargo area 42. The side walls 28a, 28b and side walls 38a, 38b may form a continuous side wall extending in the horizontal direction as shown in FIG. 2. The foot portion 34 may form a forward we of the cargo area 42. The foot portion 34 may prevent forward movement of cargo out of the cargo area 42, for example, in case of a sudden stop of the vehicle 100.

The foot support 30 may be supported in the raised position with one or more supports. For example, a support 44 may extend from the U-shaped subframe 106 of the frame 101 to the leg back portion 32. In an aspect, for example, the support 44 may be a linear actuator (e.g., hydraulic, pneumatic, electric) that drives or assists in lifting the foot support 30 to the raised position. In another aspect, the support 44 may be or include a solid rod that is manually positioned between the frame 101 and the leg back portion 32 when the foot support 30 is in the raised position. As another example, a support rod 46 may extend from the seat 22 to the foot support 30. The support rod 46 may be stowed within a channel extending longitudinally within the seat 22 when the vehicle 100 is in the passenger carrying position of FIG. 1. Once the foot support 30 is in the raised position as shown in FIG. 2, the support rod 46 may be slid longitudinally into a corresponding channel of the foot support 30. Accordingly, the support rod 46 may span the hinge 36 to prevent the hinge 36 from allowing pivoting of the foot support 30 relative to the seat back area of the front load unit 20.

Figure 4:
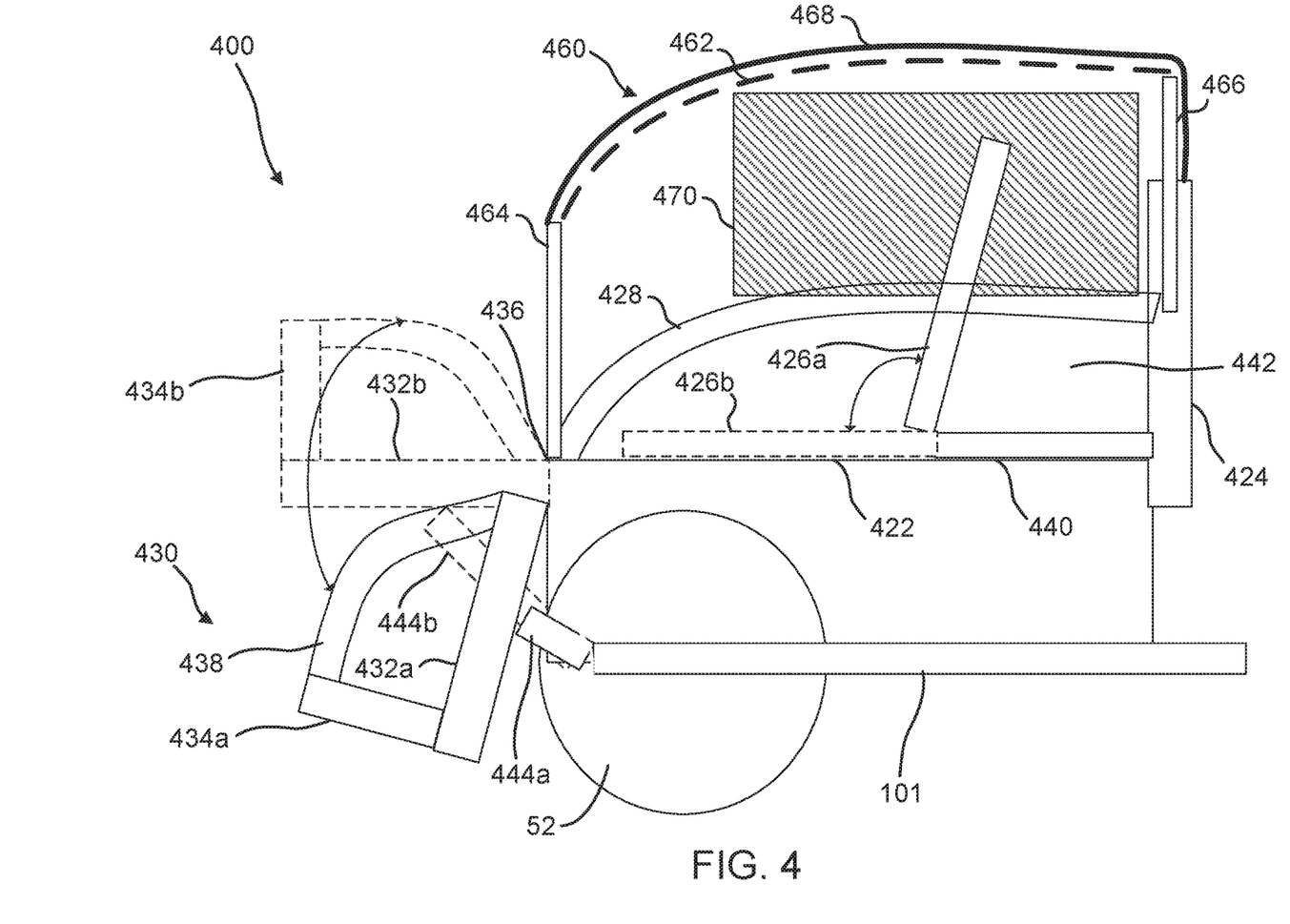
FIG. 4 is side view of a second example convertible front load unit in accordance with one aspect of the disclosure.

FIG. 4 is a side view of another example convertible front load unit 400. The convertible front load unit 400 may be mounted to the frame 101 of the vehicle 100 (FIGS. 1-3) in a similar manner as the front load unit 20 of FIGS. 1 and 2. The convertible front load unit 400 may include a cargo bed 440 that mounts to the frame 101. A folding seat area having a pivotable seat back may be mounted to the cargo bed 440. The seat back 426 may move between a raised position 426a (as positioned as shown in FIG. 4) and a collapsed position 426b (when the seat is placed in the dotted line location). In the raised position 426a, cushioning on the front of the seat back and the top edge of the bottom 422 of the seat may be exposed for contact with one or more passengers seated in the unit 400.

A cargo area 442 may be formed above the cargo bed 440 and between the seat back and the rear wall 424. In the collapsed position 426b the seat back may be folded down onto the bottom 422 of the seat area. The back surface of the seat back may align with the cargo bed 440 when the seat back is in the collapsed position 426b to extend the cargo area 442. The back surface of the seat back (i.e., the upper surface of the seat back as shown in FIG. 4 when in the collapsed position 426b) may include a durable material for supporting cargo.

The convertible front load unit 400 may include foot support 430 including a leg back portion 432a, a foot portion 434a, and side walls 438. The foot support 430 may be coupled to the cargo bed 440 by one or more hinges 436 extending between the leg back portion 432a and the cargo bed 440. The foot support 430 may pivot between a lower position as shown in solid outline in FIG. 4 and a raised position 430b as shown in dotted outline in FIG. 4. In an aspect, for example, one or more linear actuators 444a may move between a contracted state as shown in solid outline in FIG. 4 and an extended state as shown in dotted outline 444b to selectively place the foot support 430 into the raised position 434b. In the raised position 434b, the top (as shown in FIG. 4) of the leg back portion when in the position shown in dotted outline 432b as may be extend in a direction parallel to the cargo bed 440 to form a continuous extended cargo bed.

Figure 5A:
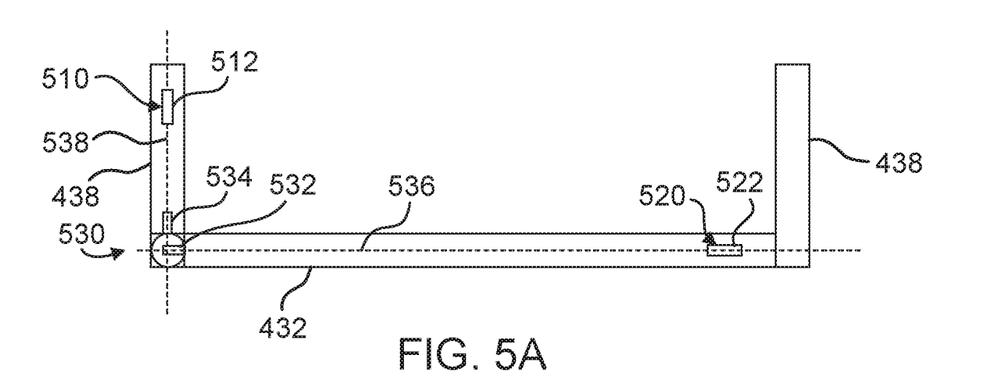
FIG. 5A is a front view of an example foot support in accordance with one aspect of the disclosure.

In an aspect, the foot portion 434 may be coupled to the leg back portion 432 and the side walls 438 via multiple releasable hinges 510, 520 (which may be examples of hinge 436) as illustrated in FIGS. 5A-5D. In FIG. 5A, the foot portion 434 is omitted for clarify of the other components. Each releasable hinge 510 may allow selective separation of the hinge, for example, by selective sliding disengagement of a hinge pin 512, 522 and/or opening of a hinge knuckle 514. In an aspect, the foot portion 434 may also be coupled to the leg back portion 432 and the side walls 438 via a dual axis hinge 530 allowing the foot portion 434 to pivot with respect to either the lea back portion 432 or the side wall 438. For example, the dual axis hinge 530 may include a first hinge pin 532 (e.g., mounted to the leg back portion 432) that allows the foot portion 434 of the dual axis hinge 530 to rotate about a first (e.g. horizontal) axis 536. The dual axis hinge 530 may also include a second hinge pin 534 that may allow the foot portion 434 to rotate about a second (e.g., vertical) axis 538. In an aspect, the foot portion 434 may generally remain coupled to the dual axis hinge 530. A first releasable hinge 510 may couple the foot portion 434 to the side walls 438, and a second releasable hinge 520 may couple the foot portion 434a to the leg back portion 432a.

Figure 5B:
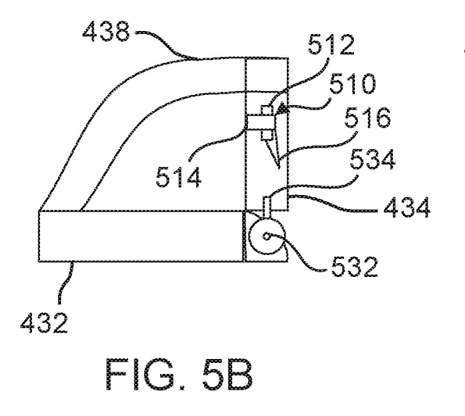
FIG. 5B is a side view of the example foot support in a closed position in accordance with one aspect of the disclosure.
Figure 5C:
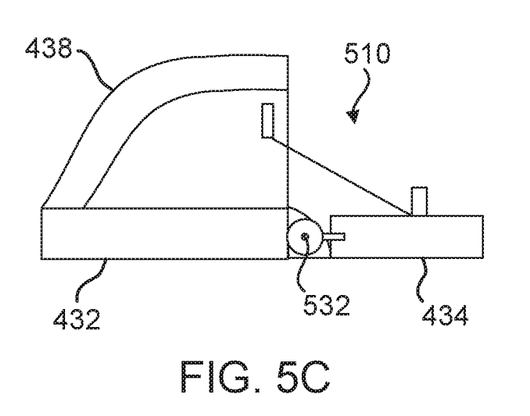
FIG. 5C is a side view of the example foot support in a vertically opened position in accordance with one aspect of the disclosure.

The first releasable hinge 510 may include a hinge pin 512, a hinge knuckle 514, a support arm 516, and a handle 518, as Illustrated in FIG. 5B. The hinge knuckle 514 may releasably retain the hinge pin 512 and rotate about the axis 538 while retaining the hinge pin 512. The handle 518 may be operatively coupled to the knuckle 514 to selectively release the hinge pin 512 (e.g., when the handle is pulled). Opening the first releasable hinge 510 may allow the foot portion 434 to rotate about the axis 536. The support arm 516 may bend when the first releasable hinge 510 is closed and extend when the first releasable hinge 510 is open. For example, as illustrated in FIG. 5C, the support arm 516 may connect the hinge pin 512 and the knuckle 514 to support the foot portion 434, which has been pivoted down at the axis 536 (e.g., like a tailgate).

Figure 5D:
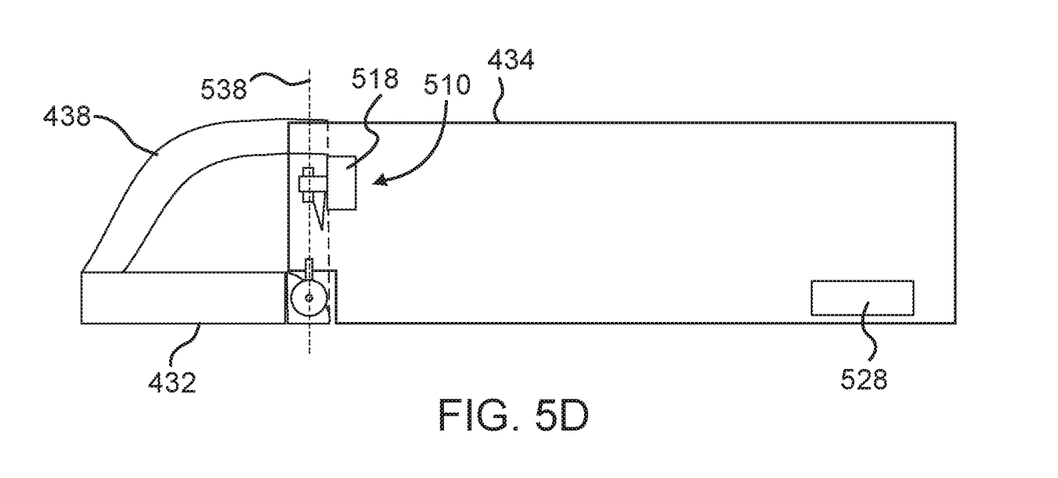
FIG. 5D is a side view of the example foot support in a horizontally opened position in accordance with one aspect of the disclosure.

The second releasable hinge 520 may include a hinge pin 522, a hinge knuckle (not shown), and a handle 528, which are similar to the corresponding parts of the first releasable hinge 510. Pulling the handle 528 may release the knuckle from the hinge pin 522 and allow the foot portion 434 to rotate about the axis 538 as illustrated in FIG. 5D. Accordingly, the foot portion 434 may be opened both horizontally and vertically.

A release handle may be associated with each of the second releasable hinge and the third releasable hinge to release each respective hinge and allow the foot portion 434a to be pivoted about the other releasable hinge. Accordingly, a user may selectively open the foot portion 434a in either direction to gain access to the cargo bed 440.

In an aspect, the convertible front bad unit 400 of FIG. 4 may include a retractable canopy 460. The retractable canopy 460 may include rails 462 that support a flexible sheet 468. In an aspect, the rails 462 may be selectively placed in a collapsed position within the top of the side wall 428. For example, each of the rails 462 may have a curvature corresponding to the top of each of the side walls 428 and fit within a channel formed in the top of each of the side walls 428. Padding that may be retracted or otherwise temporarily removed for receiving the rails 462 within the channels may be repositioned to cover the channel so as to form an armrest with the rails 462 within the top of the side walls 428. Alternatively, the rails 462 may be raised to an extended position shown in dotted line spanning the distance between the top of front post 464 and the top of rear post 466, as shown in FIG. 4. The front post 464 may telescope from and be retractable into the cargo bed 440. The rear post 466 may telescope from and be retractable into the corner formed at or near the intersection of the side wall 428 and rear wall 424.

The flexible sheet 468 may be spooled from or be foldable, for example, into a storage area within the rear wall 424. In one example implementation, the flexible sheet 468 may include, rings or wheels that slide along or otherwise engage with the rails 462 to allow the flexible sheet to be extended over the passengers and/or cargo area 442 and retracted therefrom. In an aspect, a retractable screen 470 may optionally be stowed within the side wall 428 (e.g., under the rail 462 as shown in FIG. 4) and may be selectively attached to the rail 462 and/or other features to enclose one or more sides and/or the rear of the passengers and/or cargo area 442 (e.g., to protect against wind, rain, or sun).

As shown in FIGS. 1 and 2, the vehicle 100 may include a rear wheel 50 and a pair of front wheels 52. A "wheel" or "wheels" as used herein may include a hub and extending surface (e.g., disk) portion contiguous with an outer rim. In one non-limiting example implementation, the hub may be connected to the rim via a series of tensioned spokes and/or other features. The rim may be configured to receive a tire, which may or may not be configured to contain an inflatable tube. As an alternative, the tire may be formed of a solid elastic material, and/or a material having a plurality of open and/or closed cells within an elastic material, which may include rubber, for example. The wheel hub, disk, spokes, and/or wheel rim may be formed, for example, of a metallic material, a plastic material, a composite material, or any combination thereof.

The vehicle 100 may include a frame 101, which may comprise a rigid or semi-rigid material, such as one or more plastic, composite, metals, or combinations thereof. As further shown in FIG. 3, the vehicle 100 (FIGS. 1 and 2) may further include a steering tube 103 and a steering portion 120, which may, for example, include one or more extending handlebars. The vehicle 100 (FIGS. 1 and 2) may further include a seat 127 mounted to a seatpost 128.

As also shown in the example implementation of FIG. 3, the rear wheel 50 (FIGS. 1 and 2) and the two front wheels 52 (FIGS. 1 and 2) of vehicle 100 may rotate radially about axes B and C. Each of the front wheels 52 (FIGS. 1 and 2) may include hub(s) 112a and 112b, respectively that are mountable via knuckles 114a and 114b (FIG. 3), respectively, to U-shaped subframe 106 of the vehicle frame 101. For one example, of knuckles 114a and 114b, which may be interchangeably referred to as knuckle assemblies, each hub 112a and 112b may have a respective brake disk 116a and 116b mounted for operation in relation thereto. Each brake disk 116a and 116b may be configured to be selectively engaged with a friction or other resistive force for braking movement thereof, such as via respective brake calipers 118a and 118b configured to provide selective clamping force to each brake disk 116a and 116b so as to thereby slow or prevent movement of the attached wheels. Alternatively, other non-frictional force may be used for such braking power, such as electro-magnetic based resistive force.

While not shown in FIG. 3, a similar brake disk or other braking configuration as described with relation to the rotation of front wheels 52 (FIGS. 1 and 2) about axes C and D may be mounted to the rear of the frame 101, thereby similarly allowing braking to be applied to a rear wheel rotating about axis A. For example, as shown in FIG. 3, a rear brake caliper 118c, which may be similar to front brake caliper(s) 118a-b, may also be located and configured to selectively clamp a brake disk in order to provide a friction force to the brake disk to inhibit rotation of the rear wheel, thereby providing a stopping force to the vehicle 100. Each of brake calipers 118a, 118b, and 118c may provide a resistive force to each wheel in response to a user of the vehicle depressing or otherwise engaging a brake lever or other braking mechanism (not shown in FIG. 3). In one example, both front brake calipers 118a and 118b may provide a clamping force to disks 116a and 116b respectively in response to a user depressing a first brake lever (not shown) mounted proximal to a first end of handlebar 120. Rear caliper 118c may be configured to apply a clamping force to a rear brake disk (not shown) mounted to a rear wheel 50 (FIGS. 1 and 2) rotating about axis A in response to a user depressing a second brake lever (not shown) mounted proximal to a second end of handlebar 120.

As indicated above, each of front hubs 112a and 112b may be rotatably mountable to a respective knuckle 114a and 114b, and each respective knuckle 114a and 114b may be rotatably mounted to arms 115a and 115b of frame 101. For example, such rotation of knuckles 114a and 114b may be in rotational directions denoted by arrows 170a and 170b about axes E and D, respectively. Brake calibers 118a and 118b and hubs 112a and 112b, along with corresponding wheels (not shown in FIG. 3) may be mounted to each respective knuckle or knuckle assembly 114a and 114b and similarly rotate therewith about axes E and D, respectively. As discussed in further detail below, a rotational force applied by a user, for example, to handlebar 120 may cause each hub 112a and 112b, and thus each respective wheel (not shown) and other corresponding features, to rotate in directions denoted by arrows 170a and 170b, so as to allow the vehicle to turn in a desired direction.

The vehicle frame 101 may further include a seat tube 129 for receiving a seat post 128. The seat post 128 may be configured to have a seat 127 mounted thereto. The seat post 128 may be configured to telescope within seat tube 129, thereby allowing for adjustment of the seat height of the vehicle 100 (FIGS. 1 and 2). The vehicle 100 (FIGS. 1 and 2) may optionally include pedals 102a and 102b may be rotatably connected to corresponding first 104a and second crank 104b. The cranks 104a and 104b may be rotatably connected to a shaft extending from the vehicle frame 101. The shaft may also be connected to a sprocket 105 that is configured to mesh with a chain or belt (not shown) for driving the rear wheel (not shown) about axis A. The vehicle 100 (FIGS. 1 and 2) may alternatively or also be equipped with an assist motor 109, such as an electric or other powered motor. The motor 109 may be selectively operable via the pedals 102a, 102b, for example, to provide starting motion and/or additional rotational force for driving the rear wheel (not shown) that rotates about axis A.

In one example implementation, the motor 109 may be selectively electrically powered by battery 110. However, the motor 109 and rotational cranks 104 and sprocket 105 shown in FIG. 3 serve only as one example implementation. For example, as an alternative to or in addition to motor 109, a motor may be located proximal to or within a rear hub that rotates around axis A. Further, as an alternative to or in addition to the aforementioned examples, one or more motors may be located proximal to or at one of or both of front hubs 112a and 112b. In another aspect of the disclosure, the battery may for example be implemented into the frame 101 and/or convertible front load unit 20 (FIGS. 1 and 2).

As shown in FIG. 3, the convertible front load unit 20 (FIGS. 1 and 2) may be mounted to and supported by a U-shaped subframe 106 via rear mounts 130a and 130b. The rear mounts 130a and 130b may, for example, each include a substantially concave receiving portion for assisting in receiving and directing corresponding first and second protruding extensions from the convertible front load unit 20 (FIGS. 1 and 2) into receiving locking openings in mounts 130a, 130b, that help properly position the convertible front load unit 20 (FIGS. 1 and 2). In addition, the U-shaped subframe 106 of the vehicle frame 101 may further include side mounts 131a and 131b. The side mounts 131a and 131b may, for example, comprise a through hole for receiving a mounting pin or bolt for mounting a corresponding third and fourth received portion of the front load unit 20 (FIGS. 1 and 2) in conjunction with positioning via the rear mounts 130a, 130b. Thus, rear mounts 130a and 130b and front mounts 131a and 131b allow for interchangeable mounting of one or more different types of cargo carrying portions (e.g., convertible front load unit 20 (FIGS. 1 and 2) to vehicle frame 101, for example.

In order to maintain the load floor of the cargo carrying portion supported by U-shaped subframe 106 in a low position, the steering mechanism of vehicle 100 may advantageously be located below U-shaped subframe 106 of frame 101. Further, by maintaining the steering mechanism of vehicle 100 (FIGS. 1 and 2) at a location below the U-shaped subframe 106 of frame 101, the convertible front load unit 20, which may for example be a passenger carrying portion as discussed in further detail herein, may be removed and installed with reduced risk of damage to the steering components and/or the convertible front bad unit 20 (FIGS. 1 and 2). In addition, for proper weight distribution of the vehicle 100 (FIGS. 1 and 2), when a front bad unit 20 (FIGS. 1 and 2) is mounted to frame 101, such as when carrying a bad, for example, it may be advantageous to have the rotation axis B and C of each front wheel located well forward of the rotation axis F of handlebars 120 such as with relation to a forward travel direction of the vehicle 100 (FIGS. 1 and 2). Further details of an example steering system and/or further features that are usable with the currently disclosed example vehicle are disclosed in U.S. patent application Ser. No. 16/370,408, filed on Mar. 29, 2019, the entirety of which is incorporated by reference herein.

This written description uses examples to disclose aspects of the disclosure, including the preferred aspects, and also to enable any person skilled in the art to practice the present disclosure, including making and using any devices or systems and performing any incorporated methods. The patentable scope hereof is defined by the claims, and may include other examples that occur to those skilled in the art.

Such other examples are intended to be within the scope of the claims if they have structural elements that do not differ from the literal language of the claims, or if they include equivalent structural elements with insubstantial differences from the literal language of the claims. Aspects from the various aspects described, as well as other known equivalents for each such aspect, can be mixed and matched by one of ordinary skill in the art to construct additional aspects and techniques in accordance with principles of this application.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference. Moreover, nothing disclosed herein is intended to be dedicated to the public.

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C.

| PARTS LIST FOR FIGURES | |
|---|---|
| Number | Part Names |
| 10 | battery |
| 20 | convertible front load unit |
| 22 | seat |
| 24 | shell |
| 26 | back wall |
| 28, 28a, 28b | side walls |
| 29a, 29b | window |
| 30 | support |
| 32 | leg back portion |
| 34 | portion |
| 36 | hinge |
| 38, 38a, 38b | side wall |
| 39a, 39b | removable portion |
| 42 | cargo area |
| 44 | support |
| 46 | support rod |
| 50 | rear wheel |
| 52 | front wheels |
| 100 | vehicle |
| 101 | frame |
| 102a, 102b | pedals |

-continued

| PARTS LIST FOR FIGURES | |
|---|---|
| Number | Part Names |
| 103 | steering tube |
| 104, 104a, 104b | cranks |
| 105 | sprocket |
| 106 | u-shaped subframe |
| 109 | assist motor |
| 110 | battery |
| 112a, 112b | front hubs |
| 114a, 14b | knuckles |
| 115a, 115b | arms |
| 116a, 116b | brake disk |
| 118a, 118b | brake calibers |
| 120 | handlebar |
| 127 | seat |
| 128 | seat post |
| 129 | seat tube |
| 170a | arrows |
| 170b | arrows |
| 400 | convertible front load unit |
| 422 | folding seat |
| 424 | rear wall |
| 426a | raised position |
| 426b | collapsed position |
| 428 | side wall |
| 430 | support |
| 430a | lower position |
| 430b | raised position |
| 432 | leg back portion |
| 434 | portion |
| 436 | hinges |
| 438 | side walls |
| 440 | cargo bed |
| 442 | cargo area |
| 444 | linear actuators |
| 444a | contracted state |
| 444b | extended state |
| 460 | retractable canopy |
| 462 | rails |
| 464 | front post |
| 466 | rear post |
| 468 | flexible sheet |
| 470 | retractable screen |
| 510 | first releasable hinge |
| 512 | hinge pin |
| 514 | hinge knuckle |
| 516 | support arm |
| 518 | handle |
| 520 | second releasable hinge |
| 522 | hinge pin |
| 528 | handle |
| 530 | dual axis hinge |
| 532 | first hinge pin |
| 534 | second hinge pin |
| 536 | axis |
| 538 | axis |

What is claimed is:

1. A vehicle, comprising:
 a frame having a front subframe;
 two front wheels mounted to the front subframe;
 at least one rear wheel mounted to the frame;
 a set of pedals operably engaged with one of the at least one rear wheel or the two front wheels;
 a steering shaft operably engaged with the two front wheels; and
 a front load unit supportably engageable with the front subframe, the front load unit being convertible between a passenger seat configuration and a cargo storage configuration, wherein the front load unit comprises:
 a horizontal load area;
 a substantially vertical shell forming a back wall and side walls; and a foot support hingedly mounted to the horizontal seat and pivotable between a lower position when the front load unit is configured as a passenger seat and a raised position parallel to the horizontal load area when the front load unit is configured as a cargo storage area.

2. The vehicle of claim 1, wherein the foot support includes:
   a leg back portion that forms a portion of a cargo bed in the raised position; and
   a foot portion that forms an end wall portion in the raised position.

3. The vehicle of claim 2, wherein the foot support includes a first releasable hinge connecting the end wall portion to the cargo bed and a second releasable hinge connecting the end wall portion to one of the side walls.

4. The vehicle of claim 1, wherein the foot support includes a support coupled to the frame that supports the foot support in the raised position when the front load unit is configured as a cargo storage area.

5. The vehicle of claim 4, wherein the support is an actuator that lifts the foot support to the raised position as the actuator is extended.

6. The vehicle of claim 1, further comprising a rod located within the substantially vertical shell and slidable into a channel of the foot support in the raised position to support the foot support in the raised position.

7. The vehicle of claim 1, wherein a section of the substantially vertical shell is removable to allow the pivoting of the foot support from the lower position to the raised position.

8. The vehicle of claim 1, further comprising a retractable canopy that extends out from the vertical shell.

9. The vehicle of claim 8, wherein the retractable canopy comprises:
   a pair of rails, each rail stowable within a respective side wall; and
   a flexible sheet stowed in the rear wall and slidably mounted between the two rails.

10. The vehicle of claim 8, further comprising a side screen that extends from one of the side walls to the respective rail.

11. The vehicle of claim 8, further comprising a side screen that extends from the side wall to the retractable canopy.

12. The vehicle of claim 1, wherein the horizontal load area includes a horizontal seat hingedly coupled to a seat back that pivots between a vertical position and a horizontal position, the seat back having a surface that forms a portion of a cargo bed in the horizontal position.

13. A convertible front load unit for engagement with a vehicle, comprising:
   a horizontal load area;
   a substantially vertical shell forming a back wall and side walls extending upward from the horizontal load area; and
   a foot support hingedly mounted to the horizontal load area and pivotable between a lower position when the front load unit is configured as a passenger seat and a raised position when the front load unit is configured as a cargo storage area, wherein the foot support includes:
      a leg back portion that forms a portion of a cargo bed in the raised position; and
      a foot portion that forms an end wall portion in the raised position.

14. The convertible front load unit of claim 13, wherein the foot support includes a first releasable hinge connecting the end wall portion to the cargo bed and a second releasable hinge connecting the end wall portion to at least one of the side walls.

15. The convertible front load unit of claim 13, wherein the foot support includes a support coupled to a frame that supports the foot support in the raised position when the front load unit is configured as a cargo storage area.

16. The convertible front load unit of claim 15, wherein the support is an actuator that lifts the foot support to the raised position as the actuator is extended.

17. The convertible front load unit of claim 13, further comprising a rod located within the substantially vertical shell and slidable into a channel of the foot support in the raised position to support the foot support in the raised position.

18. The convertible front load unit of claim 13, further comprising a retractable canopy that extends out from the vertical shell, wherein the retractable canopy comprises:
   a pair of rails, each rail stowable within a respective side wall; and
   a flexible sheet stowed in the back wall and slidably mounted between the two rails.

\* \* \* \* \*